United States Patent
Schnieders et al.

(10) Patent No.: US 9,340,204 B2
(45) Date of Patent: May 17, 2016

(54) ARRANGEMENT FOR CONTROLLING HIGHLY AUTOMATED DRIVING OF A VEHICLE

(71) Applicants: Heiko Schnieders, Schaafheim (DE); Jürgen Leimbach, Aschaffenburg (DE)

(72) Inventors: Heiko Schnieders, Schaafheim (DE); Jürgen Leimbach, Aschaffenburg (DE)

(73) Assignee: Continental Automotive GmbH, Hannover (DE)

( * ) Notice: Subject to any disclaimer, the term of this patent is extended or adjusted under 35 U.S.C. 154(b) by 62 days.

(21) Appl. No.: 14/461,043

(22) Filed: Aug. 15, 2014

(65) Prior Publication Data

US 2015/0051781 A1 Feb. 19, 2015

(30) Foreign Application Priority Data

Aug. 16, 2013 (DE) .......................... 10 2013 216 263

(51) Int. Cl.
*B60W 30/00* (2006.01)
*B60W 40/08* (2012.01)
*B60K 28/06* (2006.01)
*B60W 30/12* (2006.01)
*B60W 30/16* (2012.01)
*B60W 50/00* (2006.01)

(52) U.S. Cl.
CPC ................ *B60W 30/00* (2013.01); *B60K 28/06* (2013.01); *B60W 30/12* (2013.01); *B60W 30/16* (2013.01); *B60W 40/08* (2013.01); *B60W 50/0097* (2013.01); *B60W 2040/0872* (2013.01)

(58) Field of Classification Search
None
See application file for complete search history.

(56) References Cited

U.S. PATENT DOCUMENTS

| 6,226,570 | B1 | 5/2001 | Hahn | |
| 8,352,112 | B2 * | 1/2013 | Mudalige | G08G 1/163 340/435 |
| 8,823,530 | B2 * | 9/2014 | Green | B60K 28/06 180/272 |
| 2007/0142992 | A1 | 6/2007 | Gronau et al. | |
| 2010/0256836 | A1 * | 10/2010 | Mudalige | G08G 1/22 701/2 |
| 2011/0241862 | A1 * | 10/2011 | Debouk | B60W 50/035 340/439 |
| 2012/0212353 | A1 * | 8/2012 | Fung | B60K 28/06 340/905 |
| 2013/0131906 | A1 * | 5/2013 | Green | G05D 1/0055 701/23 |
| 2013/0131907 | A1 * | 5/2013 | Green | G05D 1/0055 701/23 |
| 2013/0226408 | A1 * | 8/2013 | Fung | B60W 40/09 701/41 |
| 2014/0032094 | A1 * | 1/2014 | Heinrichs-Bartscher | B60T 7/22 701/301 |
| 2014/0139341 | A1 * | 5/2014 | Green | B60K 28/06 340/576 |

FOREIGN PATENT DOCUMENTS

| DE | 19743024 | 4/1999 |
| DE | 10 2006 030 370 | 1/2008 |
| DE | 10 2009 039 774 | 3/2011 |
| DE | 10 2009 049 592 | 4/2011 |
| DE | 10 2009 050 404 | 5/2011 |
| DE | 10 2010 022 433 | 12/2011 |
| WO | WO 2005/047046 | 5/2005 |
| WO | WO 2013/034347 | 3/2013 |

* cited by examiner

*Primary Examiner* — Jason Holloway
(74) *Attorney, Agent, or Firm* — Cozen O'Connor

(57) ABSTRACT

An arrangement for controlling highly automated driving of a vehicle includes: a vehicle guiding device autonomously guiding the vehicle, an evaluation device evaluating a condition of a driver of the vehicle, and a control device controlling activation and deactivation of the vehicle guiding device. The control device activates or deactivates the vehicle guiding device on the basis of the remaining autonomous driving time during which the vehicle can be autonomously controlled by the vehicle guiding device and the reaction time of the driver.

11 Claims, 3 Drawing Sheets

ARRANGEMENT FOR CONTROLLING HIGHLY AUTOMATED DRIVING OF A VEHICLE

BACKGROUND OF THE INVENTION

1. Field of the Invention

The invention relates to an arrangement for controlling highly automated driving of a vehicle, in particular autonomous driving of a vehicle. The invention relates, furthermore, to a vehicle for highly automated driving.

2. Description of the Related Art

In the case of highly automated driving, a vehicle guiding device can take over automated guiding of the vehicle. In a sense, the vehicle guiding device takes over the functions of an autopilot. The driver himself does not participate in the process of guiding the vehicle during a time in which the vehicle is controlled autonomously by the vehicle guiding device. The driver does not have to control the vehicle himself during the time in which the vehicle guiding device for guiding the vehicle is activated.

However, during highly automated driving, situations can arise in which the vehicle guiding device must transfer control of the vehicle back to the driver. The reason for transferring guiding of the vehicle back to the driver can be as a result of the vehicle itself, for example in the case of a technical failure of a system crucial for the intended function of the vehicle guiding device. Furthermore, unexpected driving situations, obstacles or viewing obstructions can occur in the surroundings of the vehicle that make it impossible for the vehicle guiding device to safely guide the vehicle. Another cause of problems can be that a communication to other vehicles, or to service centers that support the vehicle guiding device, is only functioning inadequately.

A certain time is necessary for the transfer of control of the vehicle to the driver. This time is a reaction time $T_i$, which the driver requires in order, for example, to reach the necessary attentiveness or to recognize the driving situation so that he can safely take over the vehicle.

The vehicle guiding device is technically elaborate and must function in a failure-free and guaranteed accident-free manner during the reaction time $T_i$ of the driver. In particular, the vehicle guiding device must function reliably from detecting a problematic situation at an instant t to an instant $t+T_i$ at which the driver has safely taken over the vehicle. In order to avoid serious accidents, the reaction time $T_i$ must be dimensioned such that any driver can safely take over the vehicle under any common circumstances. The greater the reaction time $T_i$, the greater the technical complexity and the system costs.

Without knowledge about the condition of the driver and the driving situation, the reaction time $T_i$ can only be assumed to be a maximum time $T_{max}$ that corresponds to a worst-case configuration of the vehicle guiding device. However, such a configuration of an arrangement for highly automated driving leads to the highest technical expense and high costs. In the case of such a system configuration, the vehicle guiding device must often prematurely give up control to the driver, even if it could still guide the vehicle for a relatively long time, owing to the assumed high reaction time of the driver. This leads to the driver having to intervene in the control of the vehicle or being requested by the vehicle guiding device to take over the control of the vehicle, even in relatively uncritical situations in which the vehicle guiding device itself could still control the vehicle for a relatively long time.

SUMMARY OF THE INVENTION

An object of the present invention is to specify an arrangement for controlling highly automated driving of a vehicle, in which the vehicle guiding device is activated for autonomous guiding of the vehicle as often and for as long as possible. Another object of the present invention is to specify a vehicle for highly automated driving that can be autonomously guided as often and for as long as possible.

In an embodiment of an arrangement for controlling highly automated driving of a vehicle, the arrangement comprises a vehicle guiding device for autonomously guiding the vehicle, an evaluation device for evaluating a condition of a driver of the vehicle and a control device for controlling activation and deactivation of the vehicle guiding device. The vehicle guiding device is designed to guide the vehicle autonomously in an activated state. The vehicle guiding device is also designed to calculate a remaining autonomous driving time, wherein the remaining autonomous driving time indicates a time for which the vehicle guiding device can autonomously guide the vehicle. The evaluation device is designed to calculate a reaction time of the driver on the basis of the evaluated condition of the driver, wherein the reaction time indicates a time that the driver requires at most to take over control of the vehicle from the vehicle guiding device when the vehicle guiding device is in the activated state. The control device is designed to activate or to deactivate, on the basis of the remaining autonomous driving time and the reaction time of the driver, the vehicle guiding device for autonomous guiding of the vehicle.

In an embodiment of a vehicle for highly automated driving, the vehicle comprises an arrangement according to the embodiment specified above for controlling autonomous driving of a vehicle.

According to the arrangement for controlling highly automated driving of a vehicle, the reaction time $T_i$ of a driver can be individually calculated by virtue of a condition of the driver being evaluated. The arrangement can have, for example, a first sensor device for detecting the condition of the driver. The first sensor device can generate a driver condition signal on the basis of the calculated condition of the driver, which driver condition signal indicates the detected condition of the driver to the evaluation device. From the data output from the first sensor device and, optionally, driver preferences, the evaluation device can thus calculate the reaction time, being the necessary time for a driver to take over the vehicle under the present conditions.

As a result, the evaluation device can calculate the reaction time $T_i$ of the driver on the basis of the attentiveness of the driver, the driver's intent/the driver's intention and the reaction capability of the driver. The shortest time for taking over the vehicle results for an attentive driver with good reaction capability and the intention to keep the autopilot/the vehicle guiding device in the activated state for as long as possible and to quickly take over the vehicle in the event of problems. In this case, the reaction time $T_i$ corresponds to a minimum time $T_{min}$.

In addition to the first sensor device, the arrangement may have further sensor devices for detecting a condition of the vehicle, for detecting a traffic condition, for detecting a condition of the environment of the vehicle and/or for detecting a weather condition. The vehicle guiding device is designed to calculate, on the basis of the data which is provided by the further sensor devices, the remaining autonomous driving time $T_{HAF}$ for which the vehicle guiding device can safely continue to guide the vehicle autonomously.

On the basis of a comparison between the calculated remaining autonomous driving time $T_{HAF}$ of the vehicle guiding device and the calculated reaction time $T_1$ of the driver, the control device can make a decision about whether the vehicle can continue to be driven autonomously or whether the control of the vehicle must be transferred to the driver. Provided that the remaining autonomous driving time $T_{HAF}$ is greater than the reaction time $T_i$ of the driver, the vehicle guiding device can remain in the activated state and autonomously control the vehicle or the vehicle guiding device can be switched from a deactivated state into the activated state. If the remaining autonomous driving time $T_{HAF}$ is equal to the reaction time $T_i$ of the driver, the driver must be made aware by the control device, for example by indication by a warning signal, of the imminent takeover of control of the vehicle.

In contrast to a system in which the reaction time is always assumed, owing to a worst-case consideration, to be the maximum time $T_{max}$ that a driver needs at most in order to safely take over a vehicle, the reaction time $T_i$ with the specified arrangement is calculated individually for each driver. As a result, the vehicle can continue to be autonomously controlled, even if the remaining autonomous driving time is less than the maximum assumed reaction time $T_{max}$. Hence, the vehicle guiding device can be activated more often and for longer, which represents additional value for the highly automated driving system and hence for the driver since fewer transfers to the driver arise. By increased use of the highly automated, autonomous driving, a safer vehicle operation thus results, whereby the risk of accident can be lowered. A highly automated vehicle fleet equipped with the specified arrangement can thus be operated with higher safety.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further embodiments of the present invention are explained in more detail below on the basis of drawings, in which.

DETAILED DESCRIPTION OF THE PRESENTLY PREFERRED EMBODIMENTS

Figure 1:
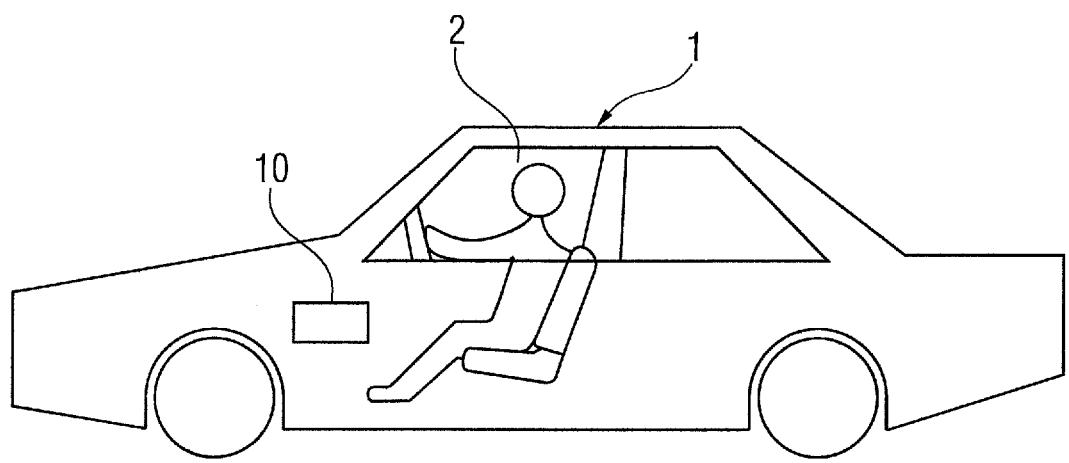
FIG. 1 shows an embodiment of a vehicle with an arrangement for controlling highly automated driving of the vehicle.

FIG. 1 shows an exemplary embodiment of a vehicle 1 with an arrangement 10 for controlling highly automated driving of the vehicle 1. The arrangement 10 is configured to detect a condition of a driver 2 and to calculate therefrom a reaction time $T_i$ of the driver. The reaction time $T_i$ of the driver indicates the time that the driver 2 requires at most to take over the control of the vehicle 1 when the vehicle has previously been autonomously controlled. On the basis of a comparison between a remaining autonomous driving time $T_{HAF}$, which has been calculated by the arrangement 10 and during which the vehicle 1 can be autonomously controlled, and the reaction time $T_i$ of the driver 2, it is determined by the arrangement 10 whether the vehicle 1 will still be controlled in a highly automated or autonomous manner, that is to say without participation of the driver, or whether the control must be transferred to the driver.

Figure 2:
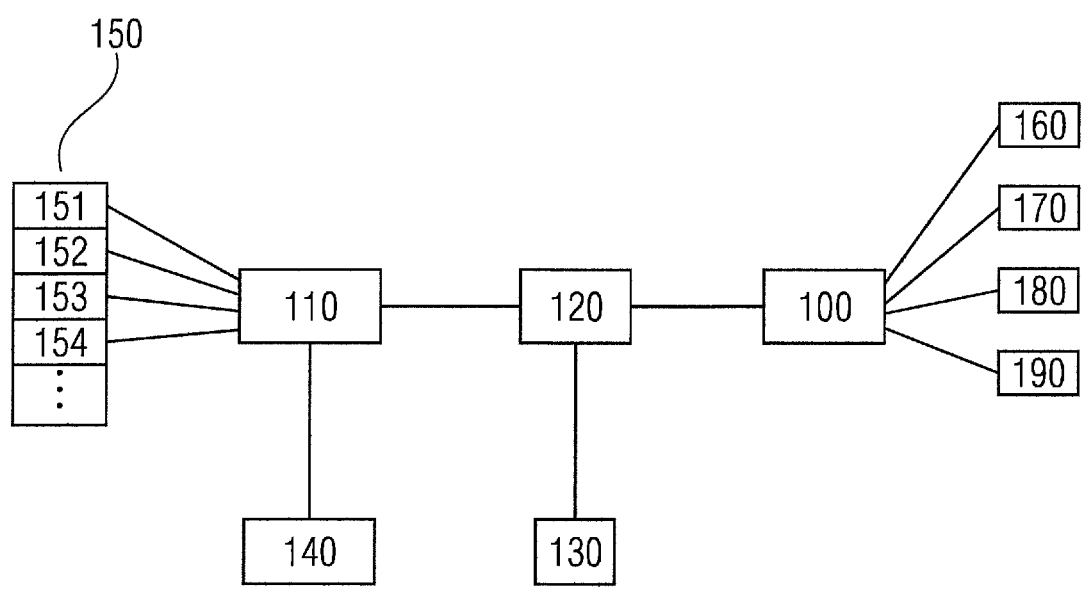
FIG. 2 shows an embodiment of an arrangement for controlling highly automated driving of a vehicle.

FIG. 2 shows an exemplary embodiment of the arrangement 10 for controlling highly automated driving. The arrangement comprises a vehicle guiding device 100 for autonomously guiding the vehicle 1, an evaluation device 110 for evaluating a condition of the driver 2 of the vehicle and a control device 120 for controlling activation and deactivation of the vehicle guiding device 100.

The vehicle guiding device 100 is configured to guide the vehicle 1 in FIG. 1 autonomously in an activated state. In a deactivated state of the vehicle guiding device, the driver 2 must take over control of the vehicle. The vehicle guiding device 100 is also configured to calculate a remaining autonomous driving time $T_{HAF}$, wherein the remaining autonomous driving time $T_{HAF}$ indicates a time for which the vehicle guiding device 100 can autonomously guide the vehicle 1.

The remaining autonomous driving time $T_{HAF}$ depends, for example, on the technical system condition of the vehicle 1, on the condition of the traffic or on a driving situation in the environment of the vehicle, for example a condition of the road or obstacles in the roadway. Furthermore, the remaining autonomous driving time $T_{HAF}$ can depend on the condition of the prevailing weather or on the communication of the vehicle guiding device with other vehicles or a server. If the communication of the vehicle guiding device with other vehicles or a server is disturbed, for example, the vehicle guiding device will calculate a small remaining autonomous driving time.

The evaluation device 110 is configured to calculate a reaction time $T_i$ of the driver 2 on the basis of the calculated condition of the driver. In this case, the reaction time $T_i$ of the driver indicates a time which the driver requires at most to take over control of the vehicle from the vehicle guiding device when the vehicle guiding device is in the active state or the vehicle is autonomously controlled by the vehicle guiding device. The condition of the driver and hence the reaction time of the driver depend, for example, on the prevailing attentiveness of the driver, the drivers intent, a driver intention and the reaction capability of the driver.

The control device 120 is configured to activate or to deactivate, on the basis of the remaining autonomous driving time $T_{HAF}$ of the vehicle guiding device and the reaction time $T_i$ of the driver, the vehicle guiding device 100 for autonomous guiding of the vehicle 1. The control device 120 can be configured, for example, to compare the remaining autonomous driving time $T_{HAF}$ with the reaction time $T_i$. Moreover, the control device 120 can be configured to switch the vehicle guiding device 100 from the deactivated state into the activated state if the control device 120 determines that the remaining autonomous driving time $T_{HAF}$ is greater than the reaction time $T_i$ of the driver. Moreover, the control device 120 can be configured to operate the vehicle guiding device 100 in the activated state provided that the remaining autonomous driving time $T_{HAF}$ is greater than the reaction time $T_i$.

If, however, the control device 120 determines that the remaining autonomous driving time $T_{HAF}$ is less than the reaction time $T_i$, autonomous driving by the vehicle guiding device 100 is not possible. In this case, the vehicle guiding device 100 remains in the deactivated state.

If the vehicle is being autonomously controlled by the vehicle guiding device 100 and the control device 120 determines that the remaining autonomous driving time $T_{HAF}$ is equal to the reaction time $T_i$ of the driver 2, preparation must be made for the takeover of control of the vehicle by the driver. For this purpose, the arrangement may contain, for example, an indicating device 130 for indicating a signal. By way of example, a warning signal can be output on the indicating device 130, which warning signal notifies the driver that the vehicle guiding device 100 cannot command the control of the vehicle for much longer and would like to transfer control of the vehicle to the driver.

The control device 120 can be configured to control the output of the signal on the indicating device 130. The control device 120 can be configured, in particular, to output the signal on the indicating device 130 at the latest when the control device 120 determines that the remaining autonomous driving time $T_{HAF}$ is equal to the reaction time $T_i$ of the driver.

According to another possible exemplary embodiment, the arrangement for controlling highly automated driving of a vehicle may have an input device 140 for inputting a time. If the driver 2 determines, for example during a journey, that the vehicle guiding device 100 notifies him about the takeover of control of the vehicle too late or too early in his opinion, the driver can modify the reaction time $T_i$ calculated by the evaluation device 110 by the input device 140 by inputting a time designation.

The evaluation device 110 is then correspondingly configured to calculate the reaction time $T_i$ on the basis of the time input by the driver. As a result, for example a longer or shorter reaction time, which is modified in comparison with the reaction time $T_i$ originally calculated by the evaluation device, can be determined. In the case of another embodiment, the driver can predefine an absolute reaction time $T_i$ by inputting a time in the input device 140 of the arrangement. The control device then adopts this time input by the driver as reaction time $T_i$ for the comparison with the remaining autonomous driving time $T_{HAF}$.

As explained above, it is possible to calculate the reaction time $T_i$ of the driver using the arrangement 10. For this purpose, the arrangement 10 has a first sensor device 150 for detecting the condition of the driver 2. The evaluation device 110 is coupled to the first sensor device 150. The first sensor device 150 is configured to generate a driver condition signal on the basis of the calculated condition of the driver 2. The driver condition signal indicates the detected condition of the driver 2. The evaluation device 110 is configured to calculate the reaction time $T_i$ on the basis of this driver condition signal.

The first sensor device 150 can have, for example, at least one camera 151 for observing the driver 2 and/or at least one sensor 152 for detecting a seat position of the driver or for detecting a movement of the driver and, optionally, for pulse evaluation. Furthermore, the first sensor device 150 can have at least one sensor 153 for detecting a physical condition of the driver. This includes, for example, sensors by which the pulse or, optionally, also a skin resistance of the driver and the consumption of alcohol or drugs by the driver can be detected. Furthermore, the first sensor device 150 can have a microphone 154 for speech evaluation, for voice evaluation or for evaluation of noises, in particular the passenger compartment volume. Furthermore, sensors or actuating elements can be provided in the vehicle interior, which sensors or actuating elements can detect the present activity of the driver or calculate an approach toward particular actuating elements.

The arrangement can have further sensors for calculating data by virtue of which the vehicle guiding device 100 can calculate the remaining autonomous driving time $T_{HAF}$. According to a possible embodiment, the arrangement 10 has a second sensor device 160 for detecting a condition of the vehicle 1. The vehicle guiding device 100 is coupled to the second sensor device 160. The second sensor device 160 generates a vehicle condition signal on the basis of the calculated condition of the vehicle 1. The vehicle condition signal indicates the detected condition of vehicle 1. The vehicle guiding device 100 is configured, in particular, to calculate the remaining autonomous driving time $T_{HAF}$ on the basis of the vehicle condition signal.

According to a possible further exemplary embodiment, the arrangement 10 may have a third sensor device 170 for detecting a condition of the traffic. The vehicle guiding device 100 is coupled to the third sensor device 170. The third sensor device 170 can generate a traffic condition signal on the basis of the calculated condition of the traffic, wherein the traffic condition signal indicates the prevailing condition of the traffic. The vehicle guiding device 100 is configured, in particular, to calculate the remaining autonomous driving time $T_{HAF}$ on the basis of the traffic condition signal. The third sensor device can be, for example, a receiver that can interrogate the present traffic conditions from a server.

According to another embodiment, the arrangement 10 has a fourth sensor device 180 for detecting a condition of the environment of the vehicle 1. The fourth sensor device comprises, for example, cameras and/or a distance radar. The vehicle guiding device 100 is coupled to the fourth sensor device 180. The fourth sensor device 180 generates an environment condition signal on the basis of the calculated condition of the environment of the vehicle 1, which environment condition signal indicates the condition of the environment of the vehicle 1. In this embodiment, the vehicle guiding device 100 is configured to calculate the remaining autonomous driving time on the basis of the environment condition signal.

According to another embodiment, the arrangement 10 comprises a fifth sensor device 190 for detecting a condition of the weather. The fifth sensor device can be, for example, a receiver that receives weather data from a service provider. The vehicle guiding device 100 is coupled to the fifth sensor device 190. The fifth sensor device 190 generates a weather condition signal on the basis of the calculated condition of the weather. The weather condition signal indicates the condition of the weather. The vehicle guiding device 100 is designed to calculate the remaining autonomous driving time on the basis of the weather condition signal.

Figure 3:
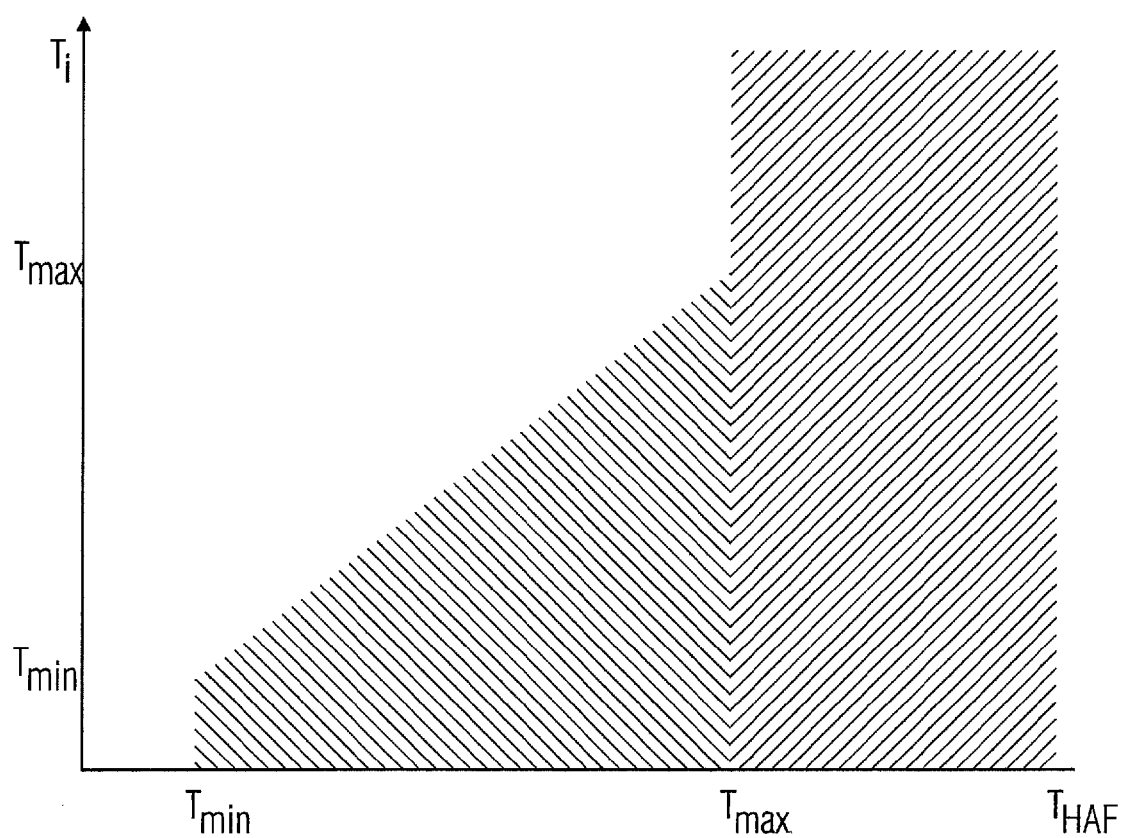
FIG. 3 shows operating ranges of a vehicle guiding device for autonomously guiding a vehicle.

FIG. 3 shows a graph of the different operating ranges of the vehicle guiding device 100 for autonomously guiding the vehicle 1 on the basis of the remaining autonomous driving time $T_{HAF}$ and the reaction time $T_i$ of the driver. A maximum time $T_{max}$ and a minimum time $T_{min}$ are defined for the remaining autonomous driving time and the reaction time. The operating range in which the vehicle guiding device 100 is operated in the activated state by the control device 120 for autonomous guiding of the vehicle 1 is shown hatched.

It can be seen from this graph that, in the event that $T_{HAF}$ is greater than $T_{max}$, the vehicle guiding device 100 can always be operated in the activated state for autonomously guiding the vehicle. If, however, the remaining autonomous driving time $T_{HAF}$ is less than $T_{min}$, the vehicle guiding device 100 is operated in the deactivated state. In this case, autonomous driving is not possible. In the event that $T_{min}$ is less than the remaining autonomous driving time $T_{HAF}$ and the remaining autonomous driving time $T_{HAT}$ is less than $T_{max}$, the vehicle guiding device 100 can only be operated in the activated state, that is to say autonomously control the vehicle, if the remaining autonomous driving time $T_{HAF}$ is greater than the reaction time $T_i$.

With reference to the operating ranges of the vehicle guiding device 100, it can be seen that the vehicle guiding device can also remain active in those situations in which the remaining autonomous driving time $T_{HAF}$ is less than a maximum assumed time $T_{max}$, if the reaction time $T_i$ is less than the autonomous remaining driving time $T_{HAF}$. Thus, the vehicle can be controlled autonomously more often and for longer and there are fewer transfers to the driver.

The vehicle guiding device does not always have to be switched back and forth between the activated and deactivated state if the value of the remaining autonomous driving time $T_{HAF}$ is below the value of the reaction time $T_i$ of the driver or if the value of the remaining autonomous driving time $T_{HAF}$ exceeds the value of the reaction time $T_i$. In the case of the decision whether the vehicle guiding device is to be activated or deactivated, a temporally variable, situation-dependent fuzzy condition can be taken into account by the control device instead. In the case of another advantageous configuration of the arrangement 10, a hysteresis time for the switchover between the deactivated and the activated operation of the vehicle guiding device can be planned for.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement for controlling highly automated driving of a vehicle, comprising:
    a vehicle guiding device (100) autonomously guiding the vehicle (1);
    an evaluation device (110) evaluating a condition of a driver (2) of the vehicle (1); and
    a control device (120) controlling activation and deactivation of the vehicle guiding device (100),
    wherein the vehicle guiding device (100) guides the vehicle (1) autonomously in an activated state,
    wherein the vehicle guiding device (100) calculates a remaining autonomous driving time, wherein the remaining autonomous driving time indicates a time for which the vehicle guiding device (100) can autonomously guide the vehicle (1),
    wherein the evaluation device (110) calculates a reaction time (Ti) of the driver (2) on the basis of the evaluated condition of the driver (2), wherein the reaction time (Ti) indicates a time that the driver (2) requires at most to take over control of the vehicle (1) from the vehicle guiding device (100) when the vehicle guiding device (100) is in the activated state, and
    wherein the control device (120) activates or deactivates the vehicle guiding device (100) on the basis of the remaining autonomous driving time and the reaction time (Ti) of the driver (2).

2. The arrangement as claimed in claim 1,
    wherein the control device (120) compares the remaining autonomous driving time with the reaction time (Ti), and
    wherein, if the control device (120) determines that the remaining autonomous driving time is greater than the reaction time (Ti) the control device (120):
        switches the vehicle guiding device (100) from a deactivated state into the activated state, or
        maintains the activated state of the vehicle guiding device (100).

3. The arrangement as claimed in claim 1, further comprising:
    an indicating device (130) indicating a signal,
    wherein the control device (120) controls the output of the signal on the indicating device (130), and
    wherein the control device (120) outputs the signal on the indicating device (130) at the latest when the control device (120) determines that the remaining autonomous driving time is equal to the reaction time (Ti).

4. The arrangement as claimed in claim 1, further comprising:
    an input device (140) inputting a time,
    wherein the evaluation device (110) calculates the reaction time (Ti) on the basis of the input time.

5. The arrangement as claimed in claim 1, further comprising:
    a first sensor device (150) detecting the condition of the driver (2),
    wherein the evaluation device (110) is coupled to the first sensor device (150),
    wherein the first sensor device (150) generates a driver condition signal on the basis of the calculated condition of the driver (2), wherein the driver condition signal indicates the detected condition of the driver (2), and
    wherein the evaluation device (110) calculates the reaction time (Ti) on the basis of the driver condition signal.

6. The arrangement as claimed in claim 5, wherein the first sensor device (150) comprises at least one selected from the group consisting of:
    at least one camera (151) observing the driver,
    at least one sensor (152) detecting a seat position,
    at least one sensor (153) detecting a physical condition of the driver and
    a microphone (154).

7. The arrangement as claimed in claim 6, further comprising:
    a second sensor device (160) detecting a condition of the vehicle (1),
    wherein the vehicle guiding device (100) is coupled to the second sensor device (160),
    wherein the second sensor device (160) generates a vehicle condition signal on the basis of the calculated condition of the vehicle (1), wherein the vehicle condition signal indicates the detected condition of the vehicle (1), and
    wherein the vehicle guiding device (100) calculates the remaining autonomous driving time on the basis of the vehicle condition signal.

8. The arrangement as claimed in claim 7, further comprising:
    a third sensor device (170) detecting a condition of the traffic,
    wherein the vehicle guiding device (100) is coupled to the third sensor device (170),
    wherein the third sensor device (170) generates a traffic condition signal on the basis of the calculated condition of the traffic, wherein the traffic condition signal indicates the condition of the traffic, and
    wherein the vehicle guiding device (100) calculates the remaining autonomous driving time on the basis of the traffic condition signal.

9. The arrangement as claimed in claim 8, further comprising:
- a fourth sensor device (180) detecting a condition of the environment of the vehicle (1),
- wherein the vehicle guiding device (100) is coupled to the fourth sensor device (180),
- wherein the fourth sensor device (180) generates an environment condition signal on the basis of the calculated condition of the environment of the vehicle (1), wherein the environment condition signal indicates the condition of the environment of the vehicle (1), and
- wherein the vehicle guiding device (100) calculates the remaining autonomous driving time on the basis of the environment condition signal.

10. The arrangement as claimed in claim 9, further comprising:
- a fifth sensor device (190) detecting a condition of the weather,
- wherein the vehicle guiding device (100) is coupled to the fifth sensor device (190),
- wherein the fifth sensor device (190) generates a weather condition signal on the basis of the calculated condition of the weather, wherein the weather condition signal indicates the condition of the weather, and
- wherein the vehicle guiding device (100) calculates the remaining autonomous driving time on the basis of the weather condition signal.

11. A vehicle (1) for autonomous driving, comprising:
an arrangement (10) having:
- a vehicle guiding device (100) autonomously guiding the vehicle (1);
- an evaluation device (110) evaluating a condition of a driver (2) of the vehicle (1); and
- a control device (120) controlling activation and deactivation of the vehicle guiding device (100),
- wherein the vehicle guiding device (100) guides the vehicle (1) autonomously in an activated state,
- wherein the vehicle guiding device (100) calculates a remaining autonomous driving time, wherein the remaining autonomous driving time indicates a time for which the vehicle guiding device (100) can autonomously guide the vehicle (1),
- wherein the evaluation device (110) calculates a reaction time (Ti) of the driver (2) on the basis of the evaluated condition of the driver (2), wherein the reaction time (Ti) indicates a time that the driver (2) requires at most to take over control of the vehicle (1) from the vehicle guiding device (100) when the vehicle guiding device (100) is in the activated state, and
- wherein the control device (120) activates or deactivates the vehicle guiding device (100) on the basis of the remaining autonomous driving time and the reaction time (Ti) of the driver (2),
- the arrangement (10) controlling autonomous driving of the vehicle (1).

* * * * *